United States Patent

Schultz

[15] 3,657,697
[45] Apr. 18, 1972

[54] VEHICLE IGNITION SWITCH JUMP CIRCUIT RESPONSIVE DEVICE

[72] Inventor: Wilderich C. Schultz, San Diego, Calif.

[73] Assignees: Frank Marino, Jr.; Hadrian J. Liberatore, San Diego, Calif., part interest to each

[22] Filed: June 1, 1970

[21] Appl. No.: 42,272

[52] U.S. Cl. ..................................340/64, 315/83, 307/10, 180/114
[51] Int. Cl. .......................................................B60r 25/10
[58] Field of Search ..............340/63, 64, 253, 276; 315/82, 315/83; 307/10; 180/114

[56] References Cited

UNITED STATES PATENTS

| 3,242,460 | 3/1966 | Morrell | 340/64 |
| 3,174,502 | 3/1965 | Howarth et al. | 180/180 UX |
| 2,956,263 | 10/1960 | Brown et al. | 340/63 |
| 3,310,775 | 3/1967 | Birth | 340/63 |

Primary Examiner—Alvin H. Waring
Attorney—Carl R. Brown

[57] ABSTRACT

A vehicle theft preventive device that is inserted into the ignition circuit and light circuit of a vehicle that, in response to jump circuiting or short circuiting the battery to the ignition system, the lights of the vehicle are caused to intermittently flash after a given time delay and a solenoid controlled valve is closed in the fuel system stopping fuel flow to the engine.

5 Claims, 1 Drawing Figure

Patented April 18, 1972
3,657,697
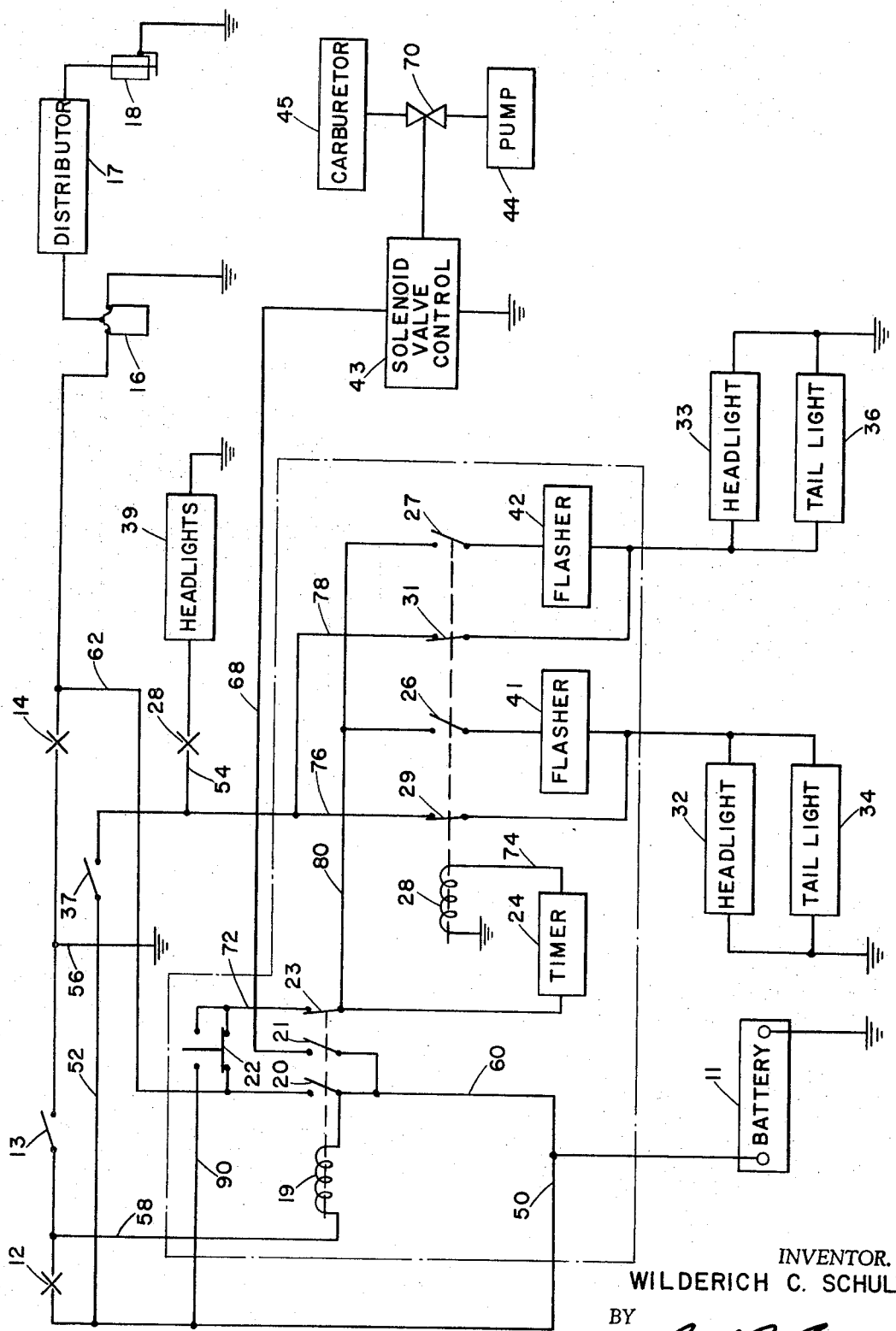
INVENTOR.
WILDERICH C. SCHULTZ
BY
ATTORNEY

VEHICLE IGNITION SWITCH JUMP CIRCUIT RESPONSIVE DEVICE

BACKGROUND OF THE INVENTION

The problem of thefts of automobiles and other such vehicles is of long standing. While many theft preventive devices and systems have been devised and used, these known devices and systems have not been entirely effective. The primary theft prevention system namely the key operated ignition, can be subverted by directly electrically connecting the battery to the engines ignition circuit, thus short-circuiting the key operated ignition switch control.

While other theft prevention systems have been used, such as locked steering columns and the like, these systems have other limitation and can often be mechanically subverted. Further while these other theft prevention systems may in some instances, prevent theft of an automobile, they do not aid in the altering of others in the vicinity that the vehicle or automobile is being stolen. Thus the car thief is able to move from vehicle to vehicle, without detection or alerting of others, until he finds a vehicle that is capable of being driven. Usually this means the finding of a vehicle that can be "jump circuited" or "hot wired," which is short circuiting of the key operated ignition switch to run the engine of the vehicle.

Thus it is advantageous to have a theft prevention device that can be quickly and easily installed in a vehicles ignition circuit, light circuit and fuel system, that both prevents operation of the vehicle after a short distance of movement and that alerts others to the fact that the vehicle is being stolen, which device is energized by the jump circuiting of the ignition system of the vehicle.

SUMMARY OF THE INVENTION

In an exemplary embodiment of this invention, a vehicle theft preventive device comprises an ignition switch jump circuit responsive device that is placed in the electrical power to ignition system circuit and between the electrical power source and the lights circuit of a vehicle, such as an automobile or the like. Also connected to the jump circuit responsive device is a solenoid control valve that interrupts the fuel flow from the pump to the carburetor. In the ignition switch jump circuit responsive device, the light and ignition switch operate in the conventional manner, wherein by closing the respective switches, the engine starts and the lights are illuminated. In the jump circuit responsive device of this invention, the closing of the key-operated ignition switch, energizes a relay that moves multiple contacts to connect the distributor and coil to the battery. The energizing of this relay also deenergizes or disarms the ignition switch jump circuit responsive device. The lights of the vehicle such as the headlights and tailights, operate in the manner of direct electrical connection to the battery.

Upon theft of the automobile by jump circuiting the ignition system, thereby directly connecting the battery to the coil around the ignition switch, then the relay is not energized and the relay contacts connect the electrical ignition condition, power to the ignition switch jump circuit responsive device. This electrical connection energizes a timer, providing a delay to the energizing of a second relay having electrical contacts that connect the vehicle lights to a flasher circuit. Further the ignition switch relay, in its non-energized condition opens the circuit to a solenoid that controls a valve in the fuel system to the carburetor, thus interrupting fuel flow to the engine.

So when the thief jumps circuits the ignition system of the vehicle, the vehicle normally has sufficient fuel in the carburetor to allow the driving of the vehicle for only a short distance. When the fuel in the carburetor is exhausted, the vehicle stops. At the same time, the timer circuit has timed out closing the circuit to the flasher units that cause the headlights and tailights to flash on and off. So not only is the vehicle thief prevented from moving the car further, but this situation is alerted to other people in the vicinity by the flashing of the headlights and tailights, often allowing apprehension of the vehicle thief by law enforcement personnel that are alerted for this type of signal.

It is therefore an object of this invention to provide a new and improved vehicle theft preventive device.

It is another object of this invention to provide a new and improved ignition switch jump circuit responsive device for vehicles and the like.

It is another object of this invention to provide a new and improved ignition switch jump circuit responsive device that causes the lighting system of a vehicle to flash intermittently after a time delay following "jump circuiting" or "hot wiring" of a vehicle, and that interrupts the fuel flow to the engine.

It is another object of this invention to provide a new and improved ignition jump circuit responsive device for causing the lighting system of the vehicle to flash intermittently after a time delay that provides means for stopping operation of the engine after a period of time delay, and that is relatively inexpensive to manufacture and is simple to install in existing vehicles.

Other objects and many intended advantages of this invention will be more apparent upon a reading of the following detailed description and an examination of the drawings wherein like reference numerals designate like parts throughout the sole FIGURE, which illustrates in schematic form a preferred embodiment of the invention.

Referring to the drawing, there is illustrated in schematic form the normal connection of the ignition system and external vehicle lights to the electrical power source, such as the battery. This circuit comprises an electrical line 50 that connects the battery 11 to the coil 16 and distributor 17 and the spark plugs 18 through the key-operated ignition switch 13. A line 52 through light switch 37 and line 54 supplies electrical power to the headlights 39, which also includes the tailights.

The ignition switch jump circuit responsive device, which is generally illustrated by the circuit enclosed within the dotted lines in the drawing, is connected into the existing ignition circuit and light circuit of the vehicle in the manner illustrated. It should be understood however, that vehicles may be originally equipped with the ignition switch jump circuit responsive device of this invention or embodiments thereof. Thus the illustrated exemplary embodiment in the drawing is representative of the manner in which the jump circuit responsive device may be installed into existing vehicle electrical systems, and also provides a means of understanding the operation of the jump circuit responsive device relative to existing vehicle electrical systems. As may be seen, the ignition circuit is opened at 12 and 14 and the light circuit 54 is open at 28. Ground connection 56 is connected to the ignition line 51 as is line 58 that connects relay 19 to battery 11 through line 60. Further line 62 connects the battery 11 through line 60 to the coil 16 and distributor 17 through closed relay contact 20, that is controlled by relay 19. A solenoid valve control 43 is connected by closed relay contact 21 and line 68 to battery 11 through line 60. The solenoid control valve 43 opens and closes valve 70 in the fuel line between pump 44 and carburetor 45. When the solenoid valve control 43 is de-energized, as when circuit contact 21 is open, then valve 70 is closed and fuel cannot pass from the pump 44 to the carburetor 45. While in this embodiment, a valve 70 is illustrated between the pump 44 and carburetor 45, other means of stopping fuel flow between the fuel supply and the engine or carburetor 45 may be employed in similar solenoid control arrangement or through de-energizing electrical fuel pumps or the like.

The ignition switch jump circuit responsive device also includes a flasher circuit means for causing the headlights and tailights to flash. In this circuit, manually operable switch 22 connects line 72 to line 62 and provides power through closed relay contact 23 to a timer 24. The timer 24 of the type that after receiving electrical power through line 72 and after a period of time delay thereafter, closes the power circuit through line 74 and relay 28 to ground. Relay 28 then pulls in its contacts 29, 26, 31 and 37. This opens the normal headlight and tailight circuits through lines 52, 76 and 78 to the respective headlights and tailights 32, 33, 34, and 36, and through closed switch 22, line 72, closed switch contact 23, line 80, closed switch contacts 26 and 27 energizes flasher units 41 and 42. It may be observed, that upon the timing out of timer 24 and the closing of relay 28, switch contacts 26 and 27 connect the headlights and tailights through flasher units 41 and 42 to a power source through line 62, irrespective of whether the headlights and tailights were earlier turned on or turned off through light switch 37.

In normal operation of the light system and the ignition system, where for instance the ignition switch 13 is closed by the key and a "jump circuit" or "hot wire" is not applied, then ignition switch 13 closed the circuit from battery 11 through line 60, relay 19, line 58, closed switch 13, and line 56 to ground. This energizes relay 19 closing contacts 20 and 21 and opening contact 23. The closing of contact 20 closes the ignition power circuit from battery 11 through line 60, closed contact 20, line 62 to the coil 16. Also the closing of switch contact 21 closes a circuit through line 68 to the solenoid valve control 43 that opens valve 70 allowing fuel to pass from the fuel pump 44 to the carburetor 45. So the vehicle then operates in the normal manner. The lights may be turned on or off by operating light switch 37, connecting the battery 11 through lines 50, 52, 76 and 78 and normally closed contacts 29 and 31 to the respective headlights and tailighss. Thus it may be seen that in the absence of an attempt to steal the vehicle by jump circuiting the ignition system, that the ignition switch jump circuit responsive device doesn't interfere with the normal operation of the ignition system and lighting system of the vehicle.

However, when a thief attempts to steal the vehicle he will normally be expected to "jump circuit" the ignition system by connecting a wire from the battery 11 directly to the input to the coil 16. This short circuits the open ignition switch 13. When this is done, then electrical power is supplied from battery 11 directly to the input coil 16, which power also passes through line 62 and through closed switch 22, line 72, closed contact 23, to timer 24. After timer 24 times out, the electrical power is applied through line 74 and through relay 28 to ground. Relay 28 is thus energized, opening contacts 29 and 31 and closing switch contacts 26 and 27, energizing the flashers 41 and 42 through line 80, thus flashing the respective headlights and tailights indicating externally to the vehicle that the vehicle is in the process of being stolen. Further, inasmuch as the hot wire connection did not apply electrical power to relay 19, then relay contacts 20 and 21 were not closed and the solenoid valve control 43 was not energized and valve 70 remained closed. Fuel cannot flow from pump 44 to pump 45 and the vehicle may only travel that distance possible with the fuel that was in the carburetor. Thus the vehicle may be moved only a short distance and after the given time period of time, the headlights and tailights will flash. This situation may be terminated by removing the hot wire connection between battery 11 and the coil 16, which opens the circuit to the ignition switch sump circuit responsive device that is self-restoring.

The emergency manually operated switch 22 can be closed through line 90 and 72 to apply power to the timer 24 to operate the flasher signals 41 and 42 after the given time delay to flash the headlights and tailights, in emergency situations.

Having described my invention, I now claim.

1. An ignition switch jump circuit responsive device for vehicles having an ignition switch circuit for electrically connecting the vehicles ignition system to an electrical power source, and a light switch circuit for electrically connecting the vehicle's lights to the electrical power source, comprising,
   flasher circuit means for overriding said light switch circuit and flashing the vehicle's lights when said flasher circuit means is energized,
   circuit means for energizing said flasher circuit means in response to jump circuiting the power source to the ignition system when the ignition switch circuit is open,
   said circuit means includes timer means for delaying the energizing of said flasher circuit means for a given period of time,
   solenoid valve means for stopping fuel flow to the engine in the vehicle when said solenoid valve means is de-energized,
   solenoid circuit means operable by the ignition switch circuit for energizing said solenoid valve means,
   and said solenoid circuit means being non-responsive to jump circuiting the power source to the ignition system.

2. An ignition switch jump circuit device as claimed in claim 1 wherein,
   said flasher circuit means energizes the left rear light independently of the right rear light and the left front light independently of the right front light.

3. In an ignition switch jump circuit responsive device as claimed in claim 2 including,
   first switch means responsive to the closing of the ignition switch circuit for opening said circuit means and closing said solenoid circuit means.

4. In an ignition switch jump circuit responsive device as claimed in claim 3 including,
   said flasher circuit means includes relay means that is energized by the timing out of said timer means for closing switch contacts that opens said light switch circuit and closes the flasher circuit means to the power source.

5. In an ignition switch jump circuit responsive device as claimed in claim 4 including,
   manually operable switch circuit means for energizing said flasher circuit means.

* * * * *